(12) United States Patent
Melton

(10) Patent No.: US 6,543,858 B1
(45) Date of Patent: Apr. 8, 2003

(54) WHEEL END ASSEMBLY

(75) Inventor: Patrick B. Melton, Horseshoe, NC (US)

(73) Assignee: Meritor Heavy Vehicle Technology, LLC, Troy, MI (US)

(*) Notice: Subject to any disclaimer, the term of this patent is extended or adjusted under 35 U.S.C. 154(b) by 0 days.

(21) Appl. No.: 09/969,296

(22) Filed: Oct. 2, 2001

(51) Int. Cl.⁷ .................................................. B60B 35/16
(52) U.S. Cl. ........................ 301/137; 188/72.2; 324/173
(58) Field of Search ........................... 301/105.1, 124.1, 301/137, 126; 188/17, 18 A, 71.9, 72.7, 72.8, 206 R; 324/173, 207.25, 174, 207.22; 384/448, 589

(56) References Cited

U.S. PATENT DOCUMENTS

| | | | | |
|---|---|---|---|---|
| 4,331,210 A | * | 5/1982 | Petrak ........................ | 180/70 R |
| 4,812,094 A | * | 3/1989 | Grube ..................... | 301/111.01 |
| 4,986,608 A | * | 1/1991 | Fett ........................... | 301/124.1 |
| 5,037,214 A | * | 8/1991 | Dougherty .................. | 384/561 |
| 5,678,933 A | * | 10/1997 | Ouchi et al. ................ | 384/448 |
| 6,017,097 A | * | 1/2000 | Weir, III ................... | 301/105.1 |
| 6,109,411 A | * | 8/2000 | Bigley ......................... | 180/247 |
| 6,218,827 B1 | * | 4/2001 | Ohmi et al. ................. | 324/173 |
| 6,254,196 B1 | * | 7/2001 | Gee .......................... | 301/105.1 |

FOREIGN PATENT DOCUMENTS

EP  323159 A1 * 5/1989

* cited by examiner

Primary Examiner—S. Joseph Morano
Assistant Examiner—Frantz F. Jules
(74) Attorney, Agent, or Firm—Carlson, Gaskey & Olds

(57) ABSTRACT

A wheel end assembly is provided which facilitates maintenance of the wheel end assembly, and further provides a more secure bearing housing. The spindle is caused to rotate with the drive axle, and is in turn connected to drive a wheel hub. In other features, a housing mounts a bearing cup structure which surrounds the spindle, and has a piloting land for positioning a brake torque plate or a spider, along with the bearing cup. A tone wheel is sandwiched between two nuts, and is caused to rotate with the spindle. The tone wheel includes a tab extending into an opening on the washer such that the washer rotates with the tone wheel. The overall assembly facilitates maintenance and assembly, and provides a more secure environment for the bearing structure.

35 Claims, 4 Drawing Sheets

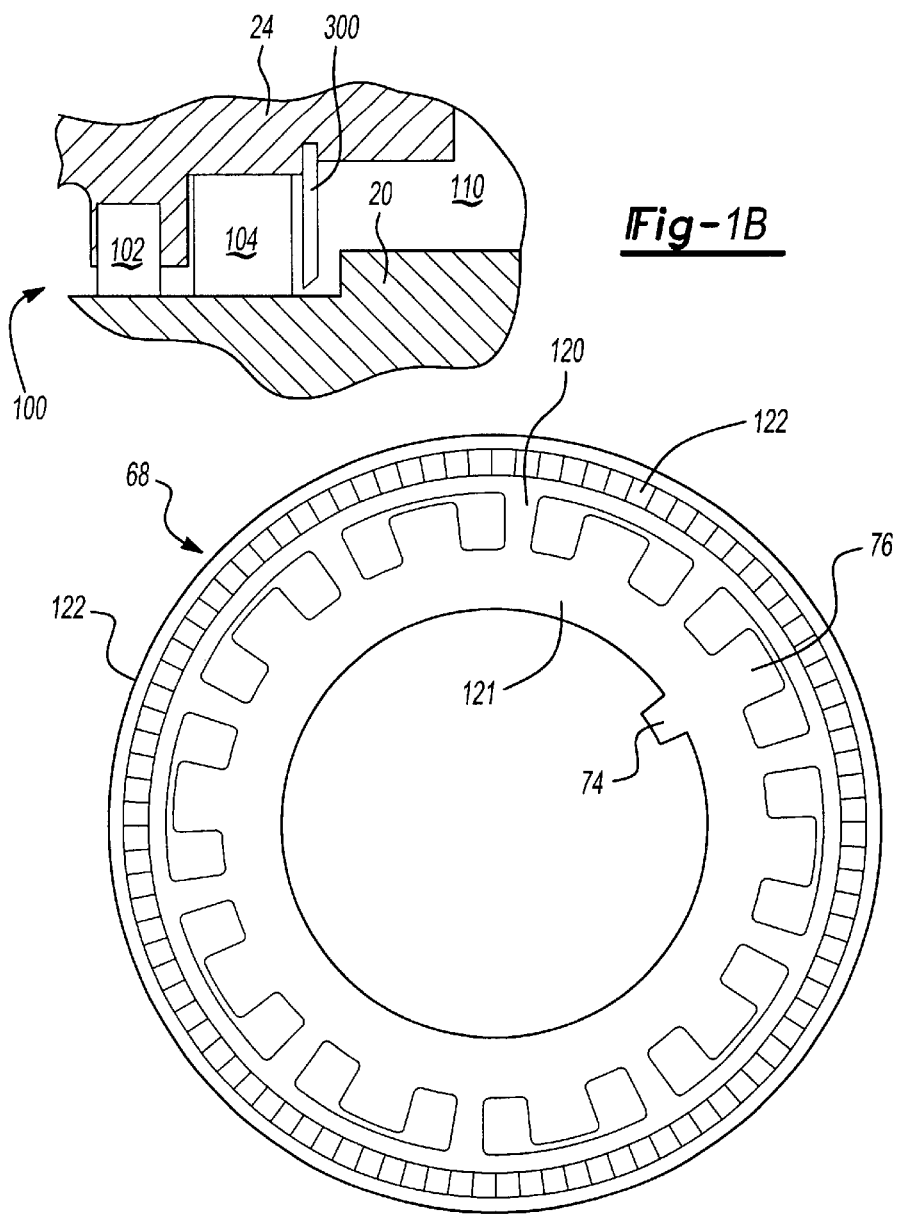
Fig-1B
Fig-2B
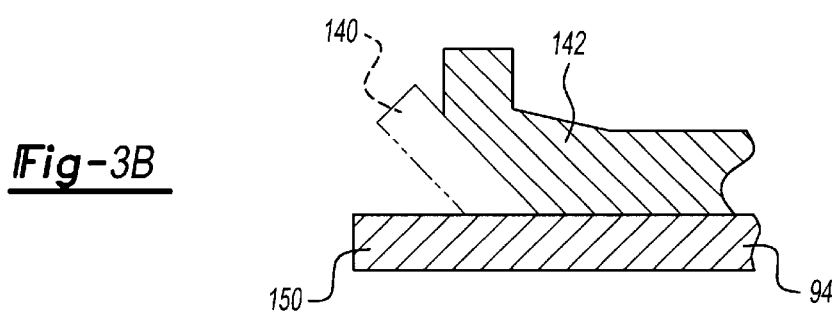
Fig-3B

WHEEL END ASSEMBLY

BACKGROUND OF THE INVENTION

This invention relates to an improved wheel end assembly having several features which provide better sealed bearings, and facilitate assembly and servicing of the components at the wheel end assembly.

Wheel end assemblies for drive axles typically include a housing surrounding the drive axle, and a fixed spindle for supporting a wheel hub. Typically, a flange extends radially outwardly from an end of the axle and is secured to the brake spider or torque plate by bolts, pins, or similar structure. Bearings support the wheel hub on the fixed spindle. It is somewhat difficult to adequately seal these bearings, which are positioned outwardly of the fixed flange on the spindle journals.

The known designs also raise challenges with regard to the assembly and servicing of the various components. As an example, to remove the wheel hub, one must typically drain the axle lube and remove the axle shaft from within the housing. Also, dissembling the wheel hub often results in disturbing the bearing package.

The housing itself has some deficiencies with regard to the arrangement and assembly of the components. To date, the spindle has been welded to a fixed housing. A brake flange has been welded to the outer periphery of the housing, and a torque plate or brake spider then welded or otherwise connected to that brake flange.

It is the goal of this invention to provide a better sealed assembly, and simplify the assembly and facilitate the maintenance of the wheel end assembly as described above.

SUMMARY OF THE INVENTION

In a disclosed embodiment of this invention, a wheel end spindle rotates with the drive axle shaft. The spindle in turn is connected to transmit rotation to the wheel hub. The wheel end assembly includes a bearing cup which surrounds the spindle and transmits the vertical wheel loads to the housing, with bearings positioned between this bearing cup and the spindle. In one embodiment, the bearing cup integrally provides the outer races, while in another, separate races are inserted. The outer housing ensures the bearings can be sealed simply and reliably. This facilitates the likelihood of long life for the bearings.

The spindle is preferably splined to be driven by the drive axle. Gear teeth transmit drive from the spindle to the hub. This simplifies the attachment by eliminating several parts required in the prior art and by eliminating the axle shaft flange.

In these embodiments, the wheel hub can be removed without complete disassembly of the wheel end assembly. That is, the axle shaft need not be removed for removal of the wheel hub. This facilitates servicing of the wheel hub, and the brake rotor, which can be serviced without removal of the axle shaft or disturbing the bearing package.

In further features, a rear housing has a forwardly extending boss that provides a piloting surface for the torque plate or brake spider, along with the bearing cup. The brake flange is preferably formed integrally at a location adjacent to this boss. The boss thus facilitates the assembly of these components.

In further features, a sensor is provided for communicating rotation information to the ABS system. The sensor preferably extends through the bearing cup, and monitors rotation of the spindle through a tone wheel arrangement, generally as is known. However, the tone wheel is mounted to the spindle in a unique fashion. In particular, a nut and a washer sandwich the tone wheel, and the tone wheel includes a flange received in a groove in the spindle. Thus, the tone wheel will rotate with the spindle. Tabs from the tone wheel preferably cause the nut to rotate with the tone wheel, assuring that the arrangement will have improved reliability.

These and other features of the present invention can be best understood from the following specification and drawings, following which is a brief description.

BRIEF DESCRIPTION OF THE DRAWINGS

FIG. 1B shows a seal detail.

FIG. 2B shows the tone wheel.

FIG. 3B shows an assembly step of the FIG. 3B embodiment.

DETAILED DESCRIPTION OF A PREFERRED EMBODIMENT

Figure 1A:
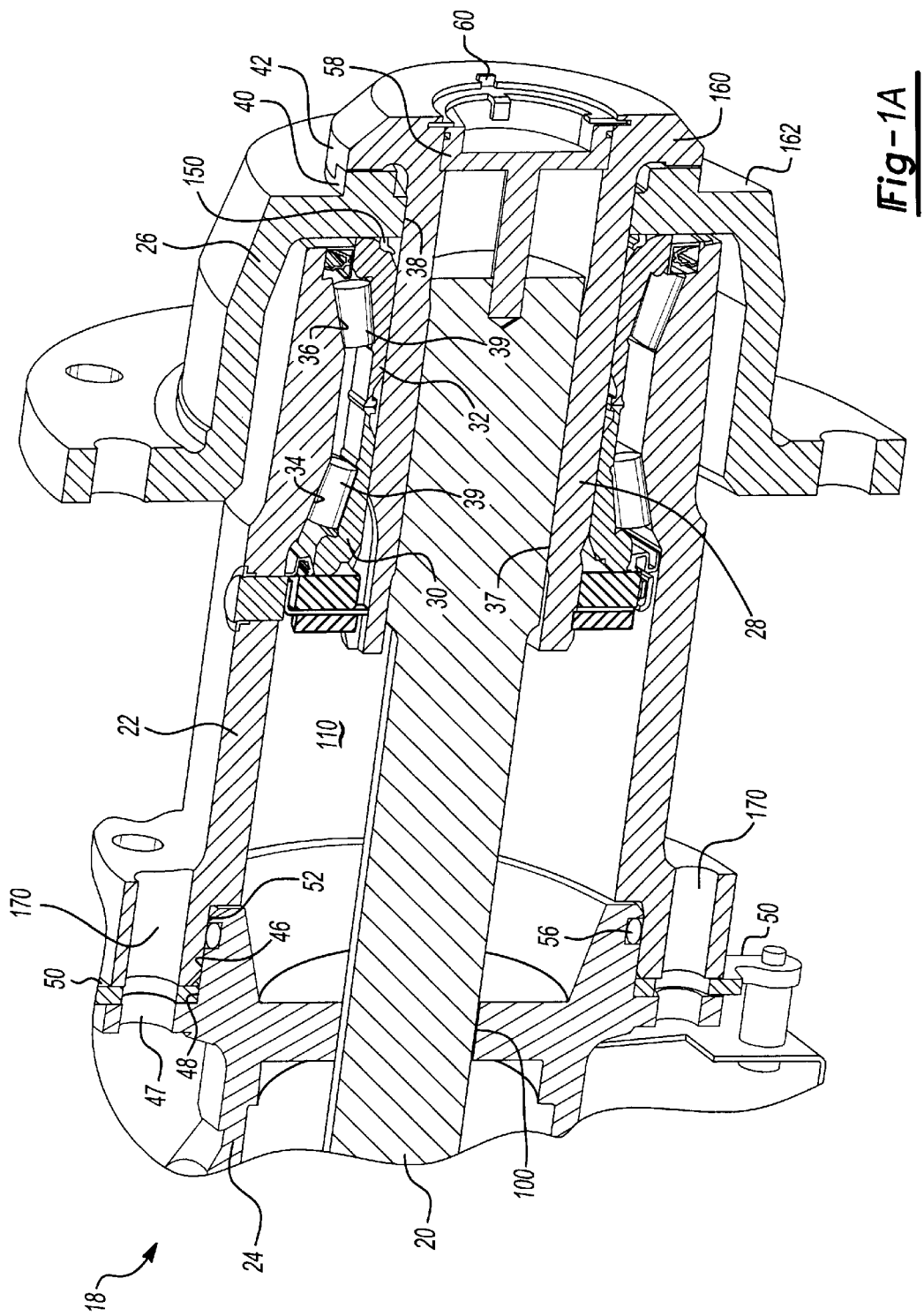
FIG. 1A is a cross-sectional view of a first embodiment wheel end assembly.

FIG. 1A shows a wheel end assembly 18 having a drive axle shaft 20 extending within an outer fixed bearing cup 22. The bearing cup member 22 is secured to a housing member 24, as will be described below. A wheel hub 26 is secured to a rotating spindle 28. Inner bearing races 30 and 32 are positioned outwardly of the spindle, and outer races 34 and 36 are formed integrally with the cup 22. Bearings 39 are positioned intermediate the races. The spindle 28 is splined at 37 to be driven by the axle shaft 20. The wheel hub is interference fit at 38 onto the spindle to help react to vertical load. Gear teeth 40 and 42 are cast into the spindle and the wheel hub and intermesh to allow the spindle to transmit torque to the wheel hub and help react vertical loads. As can be appreciated, in this embodiment, the spindle has an outer end 160 extending beyond the wheel hub and facing rearwardly, with the teeth 40 and 42 being positioned between the end 160 and an outer face 162 of the hub.

As can be further appreciated from FIG. 1B, a seal assembly 100 including a seal 104 and bushing/bearing 102 coupling retained in housing members 24 by a protective snap ring 300 seal the outer periphery of the shaft 20. The structure of housing 24 and shaft 20 is preferably as shown to receive the seal and bushing/bearing coupling. The appropriate location of the seal assembly 100 is shown in FIG. 1A with FIG. 1B showing the detail.

Lubricant which is received from within the drive axle housing, and to the left of the FIG. 1A and FIG. 1B embodiment is prevented from migrating into the bearing chamber 110 by seal assembly 100. This allows simple air to grease seals to be utilized adjacent the bearings 39 to maintain the grease in the bearing chamber. More complex lubricant to grease seals have been required in the past, but are eliminated by the provision of the seal assembly 100. Moreover, much of this ability to isolate or disturb the bearing is provided by the fact that the spindle rotates, as compared to the prior art wherein the spindle was fixed resulting in the bearing chamber being outwardly of the fixed housing. As can be appreciated from FIG. 1A, the provision of the bearing cup 22 outwardly of the rotating spindle 28 provides a bearing chamber which is relatively isolated from the outside environment, and thus protected. From this, it is more likely that the bearings will be more long-lived than in the past, and can be more assuredly provided with a lubricant, such as grease, which can be expected to survive the expected lifetime of the wheel end.

Returning again to FIG. 1A, a piloting boss 46 on the housing 24 is positioned forwardly of a brake flange 47 which may be welded to the housing 24. The inner periphery 48 of a spider or torque plate 50 is received on boss 46, as is an inner surface 52 from the bearing cup 22. Now, the housing 24, torque plate or spider 50, and bearing cup 22 are all easily positioned, aligned and connected by the piloting boss 46. The threaded holes 170 through the bearing cup 22, brake component 50, and brake flange 47, eliminate any need for a nut. Instead, the hub and brake component is secured by a lock washer, and a cap screw, arranged through the several holes 170. Of course, other mounting arrangements can be utilized. As shown, a seal 56 may be positioned within a groove in the boss 46 to further seal interior chamber 110 which receives the spindle, bearings, etc.

Further, the axle shaft 20 is retained in a longitudinal direction by a metal end cap 58, which may be provided with a removable hook structure. The cap 58 is guided within an inner end of the spindle 28. A tabbed clip ring 60 prevents relative rotation between the end cap 58 and the spindle 28, that could otherwise allow the cap to back out. The removal of the clip ring 60 and cap 58 facilitate removal of the shaft such as for towing or carrier maintenance.

Figure 2A:
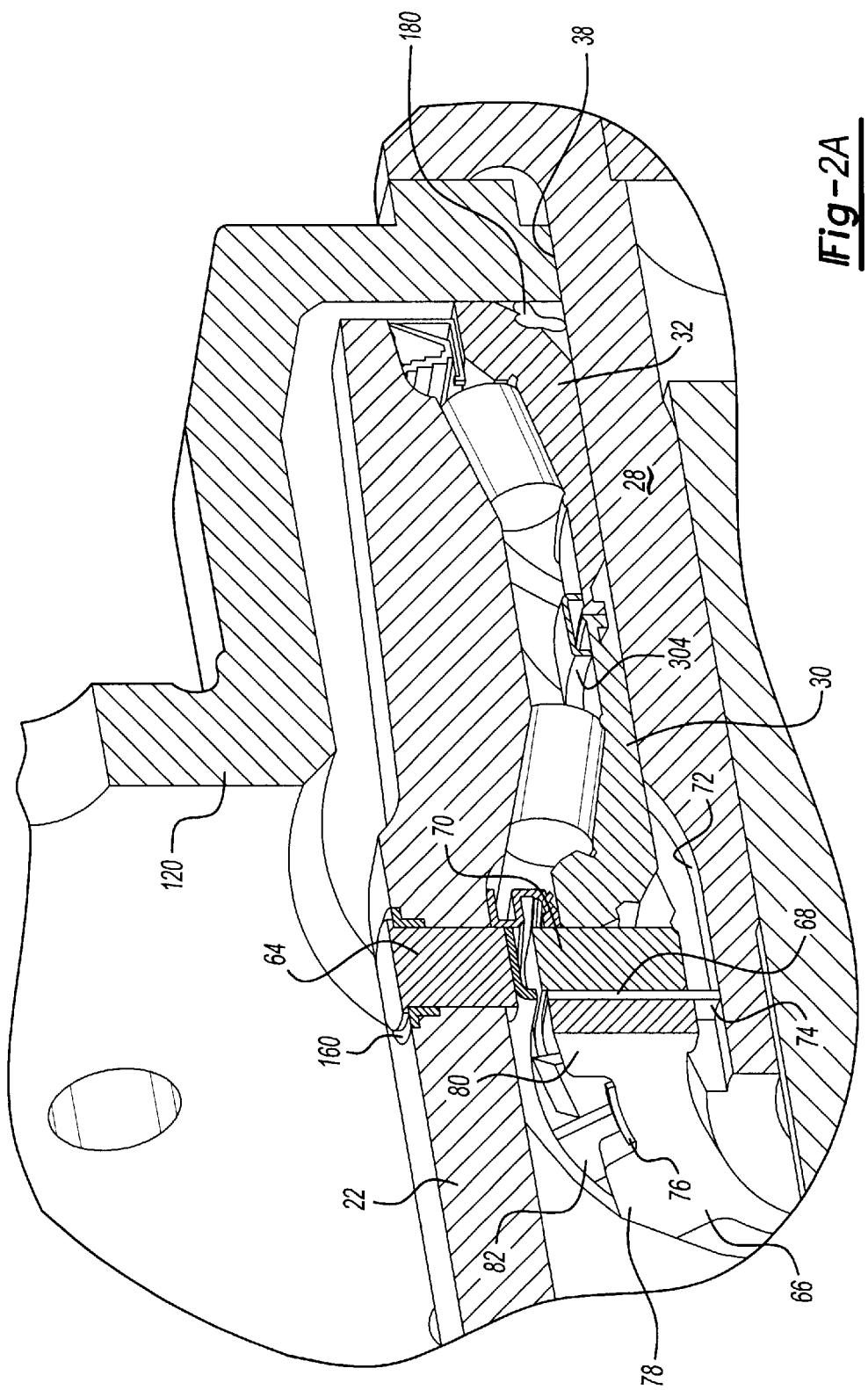
FIG. 2A shows an enlarged view of a portion of the FIG. 1 assembly

As shown in FIG. 2A, a sensor 64 is received in a rubberized bushing 160, and may extend through the cup 22 and provide rotation information to an ABS system. The operation of the sensor is as known, but it is the positioning of the sensor, and its interaction with a tone wheel 68 which is inventive. A nut 66 and a nut 70 sandwich the tone wheel. A groove 72 is formed within the outer periphery of the spindle and receives a finger 74 from the tone wheel such that the tone wheel rotates with the spindle 28.

The tone wheel includes tabs 76 which may be bent rearwardly into openings 82 between opposed fingers 78 and 80 on the nut 66. This ensures the tone wheel will rotate with the washer and with the spindle.

As can be further appreciated from FIG. 2B, the tone wheel 68 includes a plurality of tabs 76 which are initially extending generally radially outwardly, but which are bent back into openings 82 in the nut 66. Moreover, other connecting webs 120 on the tone wheel connect the inner periphery 121 of the tone wheel to an outer peripheral structure 122. Outer peripheral structure 122 includes the openings that will be sensed by sensor 64 to provide the rotation information. This feature provides a more reliable and simpler package for the positioning of the tone wheel on the spindle.

A modified shoulder seal 180 seals between the inner race, the wheel hub and the spindle. A shoulder seal may be utilized at the other end of the spindle and between the nut 70 and the inner bearing race 30, to prevent any oil ingress and eliminate any need for a central seal 304. This seal 180 and press fit 38 lowers the risk of water ingress.

Also, the spindle key 72 way may be desirably shortened to eliminate any potential leak risk.

The structure 70, 68 and 74 could include the member 70 being a holey inner nut. The inner nut assists in seating and loading the bearing races 30, 32.

Figure 3A:
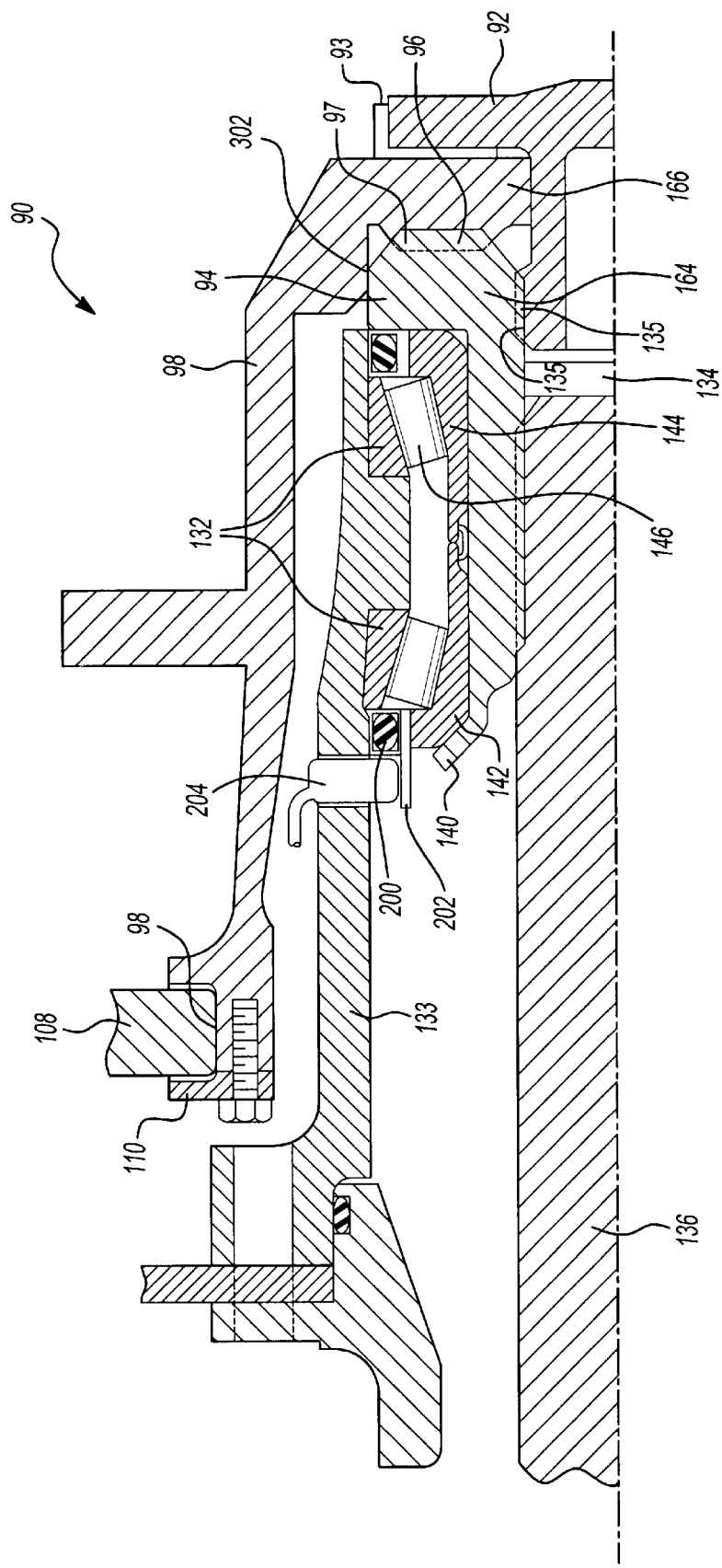
FIG. 3A shows a second embodiment.

FIG. 3A shows a second embodiment 90. A distinct arrangement of the rotating spindle 94 and hub 98 is shown.

Again, intermeshing gear teeth 96 and 97 provide the torque transmission from the spindle to the hub. One other difference with the FIG. 3A embodiment is that the end 164 of the spindle which carries the teeth 96 faces outwardly, and an inner extending surface 166 from the wheel hub carries its teeth 97. As can be appreciated, a nut 92 has an outer surface axially beyond the portion 166 of the wheel hub In this embodiment, the outer races 132 are formed separately from the bearing cup 133. A tabbed washer 93 retains nut 92, threaded at 135 into spindle 94 to provide an axial preload. A slight press fit 302 maintains concentricity between hub 98 and spindle 94. A second flat nut 134 in turn retains the axle shaft 136. The flat nut 134 is also driven into threads 135 formed within the inner periphery of the spindle 94. The threads are preferably treated to prevent rotation and seal the bearing chamber.

A brake rotor 108 is secured by a plate 110 on the hub at 98. Rotor 108 is splined onto the hub. Rather than plate 110, a snap ring and Belleville washer could be used. Further, an end 140 of the spindle is swaged radially against the inner race 142, to capture the two inner races 142, and the bearings 146 there between. In the past, bearings have been assembled by swaging the end of a bearing holding structure inwardly of a race set. However, applicant does not believe this has been done with a rotating spindle, and certainly not a rotating spindle in the inventive location.

This design allows for easy brake servicing and rotor replacement without having to disassemble the interior of the spindle, or draining the oil, etc.

As can be appreciated from FIG. 3B, this inner end 140 is initially formed to extend generally straight 150. This allows the assembly of the races 142 and 144 onto the spindle 94. The end 150 can then be swaged upwardly to position 140, again, capturing the races as explained above.

As shown at 200, a seal is formed integrally with a tone ring 202, such that the sensor 204 will be able to monitor the rotation of the tone ring. The seal provides some of the benefit as disclosed with regard to the first embodiment, but in a more simplified form. In either embodiment, the sensors can face the tone ring in either the shown vertical position, or in a horizontal orientation.

Either of the embodiments illustrated in this application provide the main benefit of a secure and reliable seal for the bearings. The bearings, once assembled, need not to be disassembled or disturbed to disassemble the wheel hub from the drive shaft, spindle, bearing cup, etc. Instead, the wheel hub can be removed for maintenance of the hub, or the brake rotor, without any disassembly or disturbance of the bearing. This facilitates a long life for the bearing, and ensures that the lubricant for the bearing can be expected to last the expected lifetime of the bearing.

While preferred embodiments of this invention are disclosed, a worker of ordinary skill in this art would recognize that many modifications would come within the scope of this invention. For that reason, the following claims should be studied to determine the true scope and content of this invention.

What is claimed is:
1. A wheel end assembly comprising:
   a drive axle shaft extending along an axis;
   a wheel hub positioned radially outwardly of said drive axle shaft;
   a spindle to be driven by said drive axle shaft, said spindle in turn driving said wheel hub, and said spindle being positioned radially between said wheel hub and said drive axle shaft; and a bearing cup structure positioned between said wheel hub and said spindle, said bearings cup structure being fixed, and bearings positioned between said bearing cup structure and said spindle, said bearing having bearing components contacting and supporting said spindle.

2. A wheel end assembly comprising:

a drive axle shaft extending along an axis;

a wheel hub positioned radially outwardly of said drive axle shaft;

a spindle to be driven by said drive axle shaft, said spindle in turn driving said wheel hub, and said spindle being positioned radially between said wheel hub and said drive axle shaft;

a bearing cup structure positioned between said wheel hub and said spindle, said bearing cup structure being fixed, and bearings positioned between said bearing cup structure and said spindle; and said spindle drives said wheel hub through a plurality of intermeshing gear teeth.

3. A wheel end assembly as set forth in claim 2, wherein said spindle has a portion axially beyond said wheel hub, and said gear teeth on said spindle facing axially inwardly and meshing with gear teeth on an axially outwardly facing surface of said wheel hub.

4. A wheel end assembly as set forth in claim 2, wherein said spindle having said gear teeth on a surface facing axially outwardly, and said wheel hub having a surface facing axially inwardly which carries said mating gear teeth.

5. A wheel end assembly as set forth in claim 1, wherein said bearing cup structure is piloted on a piloting boss from a fixed housing.

6. A wheel end assembly as set forth in claim 5, wherein brake connection structure is positioned between said bearing cup structure and a brake flange on said fixed housing, with both said brake connection structure and said bearing cup structure being guided on said piloting boss.

7. A wheel end assembly as set forth in claim 6, wherein said brake connection structure is a torque plate.

8. A wheel end assembly as set forth in claim 6, wherein said brake connection structure is a brake spider.

9. A wheel end assembly as set forth in claim 1, wherein a brake rotor is positioned on said wheel hub.

10. A wheel end assembly as set forth in claim 1, wherein a nut is threaded into an inner surface of said spindle to position said drive axle along said axis.

11. A wheel end assembly as set forth in claim 10, wherein a washer closes an end of said spindle.

12. A wheel end assembly comprising:

a drive axle shaft extending along an axis;

a wheel hub positioned radially outwardly of said drive axle shaft;

a spindle to be driven by said drive axle shaft, said spindle in turn driving said wheel hub, and said spindle being positioned radially between said wheel hub and said drive axle shaft;

a bearing cup structure positioned between said wheel hub and said spindle, said bearing cup structure being fixed, and bearings positioned between said bearing cup structure and said spindle;

a nut is threaded into an inner surface of said spindle to position said drive axle along said axis;

a washer closes an end of said spindle; and said washer also abuts an axially outer face of said wheel hub.

13. A wheel end assembly as set forth in claim 1, wherein said bearing cup structure includes an opening to receive an ABS sensor, and said spindle carries a tone wheel.

14. A wheel end assembly as set forth in claim 13, wherein said tone wheel includes tabs which are positioned within structure on a washer such that said washer will rotate with said wheel.

15. A wheel end assembly as set forth in claim 14, wherein said tone wheel further includes a finger extending into a groove on said spindle such that said tone wheel rotates with said spindle.

16. A wheel end assembly as set forth in claim 1, wherein a housing surrounds said drive axle shaft and is attached to said bearing cup structure, a seal on said housing sealing an outer periphery of said drive axle shaft to seal between an inner portion of said drive axle shaft, and said bearings.

17. A wheel end assembly as set forth in claim 16, wherein a plurality of seals are positioned to seal between said housing and said drive axle.

18. A wheel end assembly as set forth in claim 1, wherein an axially inner end of said spindle is swaged outwardly to capture bearing races on said bearings after assembly of said bearing races and said bearings on said spindle.

19. A wheel end assembly comprising:

a fixed housing including a brake flange extending from a radially outer surface, and a piloting boss positioned forwardly of said brake flange;

a brake connection structure positioned forwardly of said brake flange and on said piloting boss;

a bearing cup structure also received on said piloting boss, and a seal on said piloting boss providing sealing between said bearing cup and said piloting boss; and a wheel hub operatively connected to be driven.

20. A wheel end assembly as set forth in claim 19, wherein a spindle is positioned radially inwardly of said bearing cup structure, said spindle to be driven, and in turn driving said wheel hub.

21. A wheel end assembly as set forth in claim 19, wherein said brake connection structure is a torque plate.

22. A wheel end assembly as set forth in claim 19 wherein said brake connection structure is a brake spider.

23. A wheel end assembly as set forth in claim 19, wherein a drive axle shaft extends along an axis, and drives said wheel hub.

24. A wheel end assembly comprising:

a rotating housing part rotating with a drive axle;

a fixed housing positioned adjacent to said rotating part, said fixed housing carrying an ABS sensor; and a tone wheel operatively exacted to rotate with said rotating part, said tone wheel including a finger extending into a groove in said rotating part, and a member on one side of said tone wheel, said tone wheel including a tab extending into an opening in said member to cause said member to rotate with said tone wheel.

25. A wheel end assembly as set forth in claim 24, wherein said fixed housing is a bearing cup positioned radially outwardly of said drive axle, and said rotating part is a rotating spindle positioned radially inwardly of said bearing cup.

26. A wheel end assembly as set forth in claim 24, wherein said member is a nut positioned outwardly of said tone wheel.

27. A wheel end assembly as set forth in claim 26, wherein said nut applies a preload onto bearing races received on said rotating part.

28. A method of assembling a rotating spindle comprising the steps of:

(1) providing the rotating spindle to be secured to a drive axle, and providing a bearing cup to be positioned outwardly of said rotating spindle;

(2) positioning at least one inner bearing race on an outer periphery of said spindle, and positioning bearings outwardly of said inner race; and (3) bending an axially inner end of said spindle radially outwardly to capture said races on said outer periphery of said spindle.

29. A wheel end assembly comprising:

a wheel hub positioned radially outwardly of a drive axis;

a spindle to be driven about said drive axis, said spindle in turn driving said wheel hub, said spindle being positioned radially inwardly of said wheel hub; and a bearing cup structure positioned between said wheel hub and said spindle, said bearing cup being non-driven, and bearings positioned between said bearing cup and said spindle, said bearing shaving bearings components contacting and supporting said spindle.

30. A wheel end assembly as set forth in claim 29, wherein said spindle drives said wheel hub through a plurality of intermeshing gear teeth.

31. A wheel end assembly as set forth in claim 30, wherein said spindle has a portion axially beyond said wheel hub, and said gear teeth on said spindle facing axially inwardly and meshing with gear teeth on an axially outwardly facing surface of said wheel hub.

32. A wheel end assembly as set forth in claim 30, wherein said spindle having said gear teeth on a surface facing axially outwardly, and said wheel hub having a surface facing axially inwardly which carries said mating gear teeth.

33. A wheel end assembly as set forth in claim 29, wherein said bearing cup structure includes an opening to receive an ABS sensor, and said spindle carries a tone wheel.

34. A wheel end assembly as set forth in claim 33, wherein a sensor extends through said bearing cup structure, said sensor being positioned adjacent a tone wheel, said tone wheel being formed integrally with a seal.

35. A method as set forth in claim 28, further including the steps of said bearing race abutting an outwardly extending shoulder at an outer end of said spindle in step (2).

* * * * *

UNITED STATES PATENT AND TRADEMARK OFFICE
CERTIFICATE OF CORRECTION

PATENT NO.     : 6,543,858 B1
DATED          : April 8, 2003
INVENTOR(S)    : Patrick Melton It is certified that error appears in the above-identified patent and that said Letters Patent is hereby corrected as shown below:

<u>Column 7,</u>
Line 19, "shaving" should be -- having --.

Signed and Sealed this

Twenty-fourth Day of June, 2003

JAMES E. ROGAN
*Director of the United States Patent and Trademark Office*